Oct. 11, 1927.  
W. B. JARVIS  
RADIATOR CAP  
Filed April 23, 1925
1,645,384
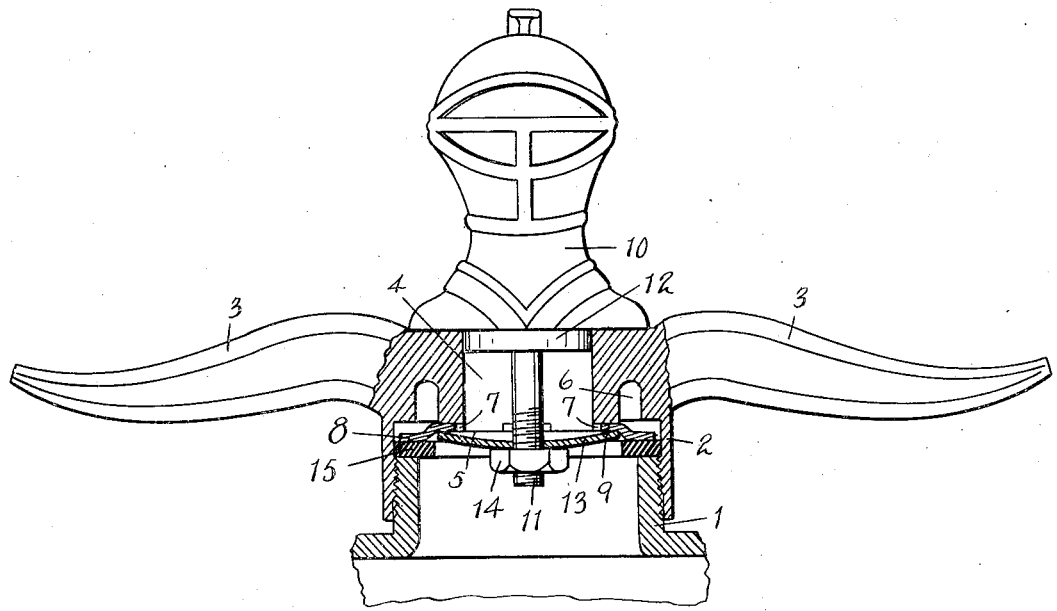
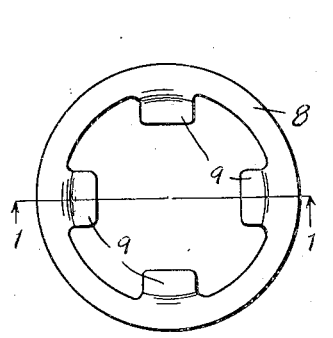
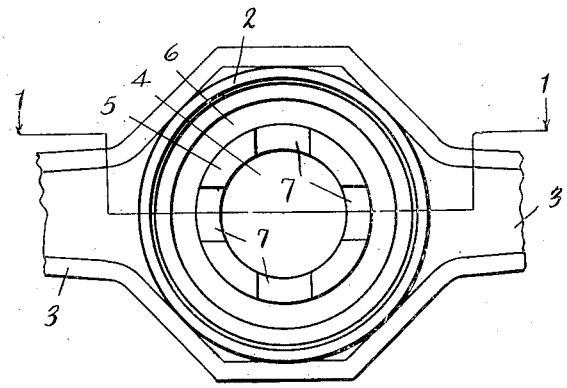
INVENTOR  
William B. Jarvis  
BY  
Chappell & Earl  
ATTORNEYS Patented Oct. 11, 1927.

1,645,384

UNITED STATES PATENT OFFICE.

WILLIAM B. JARVIS, OF GRAND RAPIDS, MICHIGAN.

RADIATOR CAP.

Application filed April 23, 1925. Serial No. 25,272.

This invention relates to improvements in radiator caps.

The main object of this invention is to provide an improved radiator cap having arms or ornamental features which may be adjusted to properly align or position upon the radiator.

Objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a fragmentary view of a structure embodying the features of my invention partially in vertical section on a line corresponding to line 1—1 of Fig. III.

Fig. II is a plan view of the thrust member removed from the cap.

Fig. III is a fragmentary inverted view of the body member of the cap with the top and thrust member removed.

In the drawing similar reference characters refer to similar parts throughout the several views, and the sectional views are taken looking in the direction of the little arrows at the ends of the section lines.

Referring to the drawing, 1 represents the neck of an automobile radiator.

My improved radiator cap comprises a chambered body member 2 internally threaded to coact with the threads of the neck 1.

The body member illustrated has opposed projecting arms 3. The body member is formed with a central bore 4 and is internally shouldered at 5, the shoulder having an annular groove 6 therein with radial recesses 7.

The annular spring thrust member 8 has inwardly projecting upwardly offset spring fingers 9 disposed in these recesses 7.

The ornamental head or top member 10 has a depending threaded shank 11 and is shouldered at 12 to fit into the bore 4. A clamping disc 13 is arranged on the shank, being clamped thereon by means of the nut 14 so that it serves not only as a securing means for the top member but also as a means for clamping the thrust member fingers in the recesses, the engagement of the fingers with the recesses preventing rotative movement of the thrust member.

A bearing member 15 of resilient material is arranged below and supported by the thrust member to engage the end of the neck upon which the cap is threaded. This thrust member yields sufficiently to permit the cap being adjusted to properly align or position the arms or head or other ornamental features or the like and also serves as a locking means for preventing the accidental turning of the cap for retaining it in its adjusted position.

I have illustrated and described but one form or adaptation of my improvements as I believe the disclosure made will enable those skilled in the art to embody or adapt the same as may be desired.

Having thus described my invention, what I claim as new and desire to secure by Letters Patent, is:

1. In a cap, the combination of a chambered body member having an internal downwardly facing shoulder with radially disposed recesses therein, a top member shouldered to engage said body member and having a shank depending into said body member, an annular spring thrust member having inwardly projecting upwardly offset fingers disposed in said recesses in said shoulder, a clamping disc arranged on said shank to engage said thrust member fingers, and a clamping nut threaded upon said shank to clamp said clamping disc.

2. In a cap, the combination with a threaded neck of a body member threaded to engage said neck and having an internal annular shoulder with recesses therein, a top member having a shank depending into said body member, a spring member disposed within said body in coacting relation to the end of the neck and having inwardly projecting fingers disposed in said recesses in said shoulder, a clamping disc arranged on said shank to engage said spring member fingers, and a clamping nut for said disc.

3. In a cap, the combination with a threaded neck of a chambered head member threaded to engage said neck, and a top member shouldered to engage said body member and having a shank depending into said body member, an annular thrust member disposed within said body in coacting relation to the end of the neck and having inwardly projecting spring fingers engaging said head member, a clamping disc arranged on said shank to engage said thrust member fingers, and a clamping nut threaded upon said shank to clamp said clamping disc.

4. In a cap, the combination with a threaded neck of a body member threaded to engage said neck and having an internal annular shoulder with recesses therein, a top member having a shank depending into said body member, an annular spring thrust member disposed within said body member to coact with the end of the neck, securing means therefor carried by said shank and constituting means for securing said top member to said body, and a bearing member disposed within said body member below said thrust member.

5. In a cap, the combination with a threaded neck, of a cap threaded to engage said neck and having an internal annular shoulder with recesses therein and an internal shank disposed centrally thereof, a spring member disposed within said body in coacting relation to the end of the neck and having inwardly projecting fingers disposed in said recesses in said shoulder, a clamping disc arranged on said shank to engage said spring member fingers, and a clamping nut for said disc.

6. The combination with a threaded neck, of a body member threaded to engage said neck, a projecting top member having a shank disposed through an opening in said body member, an annular thrust member disposed within said body member to coact with the end of the neck, means on said shank for securing said top member in fixed position on said body member, said means also retaining said thrust member in position, and an annular gasket disposed between the said thrust member and the end of the neck.

7. The combination with a threaded neck, of a cap threaded to engage said neck and having an internal depending non-yieldingly supported shank, an annular spring member seated at its inner edge within said cap to yieldingly cooperate with the end of the neck for holding the cap in its position of threaded adjustment upon the neck, a support member mounted on said shank to engage said spring member for holding it to its said seat in said cap, and a nut threaded upon said shank to clamp said support member upon said spring member.

8. The combination with a threaded neck, of a cap threaded to engage said neck and having an internal depending relatively fixed shank, a gasket disposed on the end of the neck, an annular spring thrust member seated at its inner edge within said cap to engage said gasket for applying yielding pressure thereto and retaining the cap in its adjusted position upon the neck, and means on said shank for supporting said spring member on its seat in said cap.

9. The combination with a threaded neck, of a cap threaded to engage said neck and having a relatively fixed depending shank, a gasket disposed on the end of the neck, an annular spring thrust member disposed within said cap in opposed relation to the end of the neck for applying yielding pressure to the gasket and holding the cap in its adjusted position on the neck, and means on said shank engaging the inner portion of said spring thrust member supporting it in position and permitting its outer portion to yield.

10. The combination with a threaded neck, of a chambered internally threaded cap having an internal annular shoulder, a gasket arranged on the end of the neck, an annular spring member having its inner portion seated against said shoulder and its outer portion coacting with said gasket for applying yielding pressure thereto and retaining the cap in its adjusted position on the neck, and means for retaining said spring member on its said seat in said cap.

In witness whereof I have hereunto set my hand.

WILLIAM B. JARVIS.